United States Patent [19]

Sherman

[11] 4,043,505

[45] Aug. 23, 1977

[54] METHOD AND APPARATUS FOR REVERSIBLY POWERING A MOBILE IRRIGATION SYSTEM

[75] Inventor: Roger M. Sherman, Los Altos, Calif.

[73] Assignee: MAC Corporation, San Jose, Calif.

[21] Appl. No.: 690,414

[22] Filed: May 27, 1976

Related U.S. Application Data

[63] Continuation of Ser. No. 544,208, Jan. 27, 1975, abandoned.

[51] Int. Cl.$^2$ .............................................. B05B 3/18
[52] U.S. Cl. .................................... 239/11; 137/344; 239/212
[58] Field of Search .................... 239/1, 11, 177, 212; 137/344; 123/41 R, 179 BG

[56] References Cited

U.S. PATENT DOCUMENTS

| 2,635,417 | 4/1953 | Brooks | 123/41 X |
| 2,881,744 | 4/1959 | Fox | 123/41 |
| 3,415,270 | 12/1968 | Stilwell | 137/344 |
| 3,780,947 | 12/1973 | Ririe et al. | 239/177 |
| 3,836,078 | 9/1974 | Olson et al. | 239/177 X |
| 3,929,197 | 12/1975 | Malott et al. | 180/2 |

Primary Examiner—Evon C. Blunk
Assistant Examiner—Michael Mar
Attorney, Agent, or Firm—Limbach, Limbach & Sutton

[57] ABSTRACT

A mobile irrigating system comprising a plurality of wheel mounted irrigating pipes coupled together in a line to a central, motorized power unit having a reversible, internal combustion engine which is remotely controllable from the end of the line of irrigating pipes.

6 Claims, 7 Drawing Figures

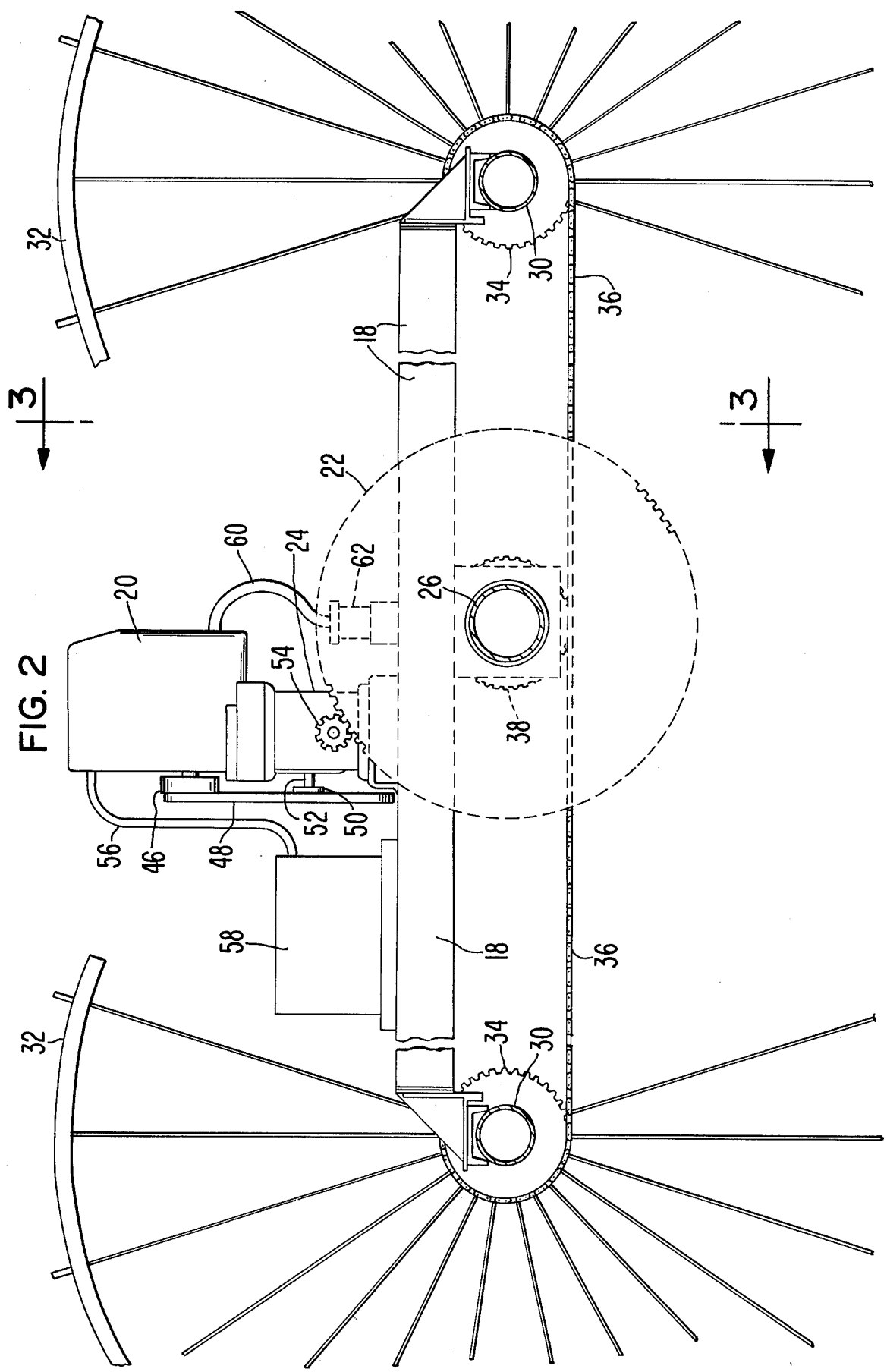

METHOD AND APPARATUS FOR REVERSIBLY POWERING A MOBILE IRRIGATION SYSTEM

This is a continuation of application Ser. No. 544,208, filed Jan. 27, 1975, now abandoned.

BACKGROUND OF THE INVENTION

The invention relates to a power mover for use in a mobile irrigating system and more particularly to a power mover connected in the center of a line of coupled wheel-mounted irrigating pipes.

Various types of power movers are used in mobile irrigating systems. In some such systems a plurality of hydraulic motors are provided along a length of the coupled irrigating pipes to move the pipes. In other systems lengths of wheel-mounted irrigating pipes which carry sprinkler heads are coupled together in a long line to be rolled across the field to be irrigated. In order to provide the motive power to rotate the line of wheeled irrigating pipes, a power unit is connected in the middle of the line of irrigating pipes.

The centralized power unit applies a torque to the wheel-mounted pipes through a motor-driven bull gear which is mounted on a wheeled carriage which straddles the pipe. Driving power is usually also provided to the wheels of the carriage as well as to the bull gear.

All prior art mobile irrigating systems suffer from a number of disadvantages involving loss of power, maintenance, or inconvenient controls. For example, in order to allow the driving torque to be reversed in some systems the motor turns the bull gear through a hydraulic drive assembly. One problem in such types of movers is that there can be a high degree of maintenance required in the hydraulic pump for it to operate properly. In still other systems rotational power from a motor at the side end of the pipes is coupled to two or more planetary transmissions on the central unit via a drive shaft which extends along the length of coupled pipes. One disadvantage of this type of system is in frictional losses, particularly when the line of irrigating pipes becomes misaligned or slightly bent as the system is moved across the field.

In systems having a centralized power mover with an internal combustion engine the operator must walk out to the midpoint of the line of pipes, which may be as long as ⅛ to ¼ of a mile, and then start the engine in the desired direction and walk with the assembly until it has reached the new position. He must then stop the engine and walk back out to the end of the line of pipes and couple it up to the water supply system. In farm operations where labor is scarce or expensive, such a requirement becomes highly undesirable because it needlessly consumes a relatively large amount of time by the worker.

In many mobile irrigation systems, since the sprinkler heads are attached directly to the lengths of rotating pipe, alignment can be a critical problem since the entire line of coupled pipes must be rotated to the new position and stopped at exactly the point where the sprinkler heads are pointed in the proper direction so that they will properly irrigate the field. This sometimes requires a certain amount of jockeying of the power mover. In systems having hydraulic drives this is accomplished by reversing the flow of hydraulic fluid to the drive. In systems utilizing a direct drive, internal combustion engine, however, this jockeying is much more difficult to carry out. One system attempts to overcome this problem by utilizing the technique described above of a drive shaft mounted on the pipes to transmit power to the central unit from a hand-held engine connected to the drive shaft at the end of the coupled pipes nearest the side of the field. The system is made reversible simply by providing couplings on both ends of the engine drive shaft. To reverse the direction of travel the engine is uncoupled from the pipe-mounted drive shaft, turned 180° and recoupled to the pipe-mounted drive shaft. A major disadvantage of this system is that the engine must be physically lifted by the operator, thus precluding its operation by most women and children. Since women and older children often work on family-owned farms, this advantage makes the use of such a system on a family-owned farm uneconomical.

It is necessary for all these systems to operate over an entire season with a minimal amount of maintenance. Electric drive motors are thus extremely impractical, first because of the difficulty in properly insulating them from the water spray, and secondly because of the weight of the batteries which would be required to power the unit through an entire season. Even with an internal combustion engine the problem in some systems of keeping the unit powered throughout an entire season can be vexing since fuel must usually be carried out to the middle of the field.

SUMMARY OF THE INVENTION

The above and other disadvantages are overcome by the present invention of an improved, mobile irrigating system of the type having a plurality of wheel-mounted irrigating pipes coupled in line to a central, motorized power unit which turns the irrigating pipe wheels by turning the line of coupled pipes with the improvement being a reversible, internal combustion engine for operating the central, motorized power unit, and a control unit mounted at the end of the coupled pipes for selectively starting the internal combustion engine of the centralized power unit in either of two directions. The end-mounted control unit transmits a control signal to the centralized power unit in part through the coupled line of irrigating pipes and in part through an insulated electrical cable.

It is therefore an object of the present invention to provide an improved mobile irrigating system having a centralized, internal combustion engine powered unit which may be driven in either of two directions from a control mounted at the end of a coupled line of irrigating pipes.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 2 is an enlarged, detailed, vertical view, with portions broken away and in phantom line for purposes of clarity, taken generally along the lines 2—2 of FIG. 1;

DETAILED DESCRIPTION OF CERTAIN PREFERRED EMBODIMENTS

Figure 1:
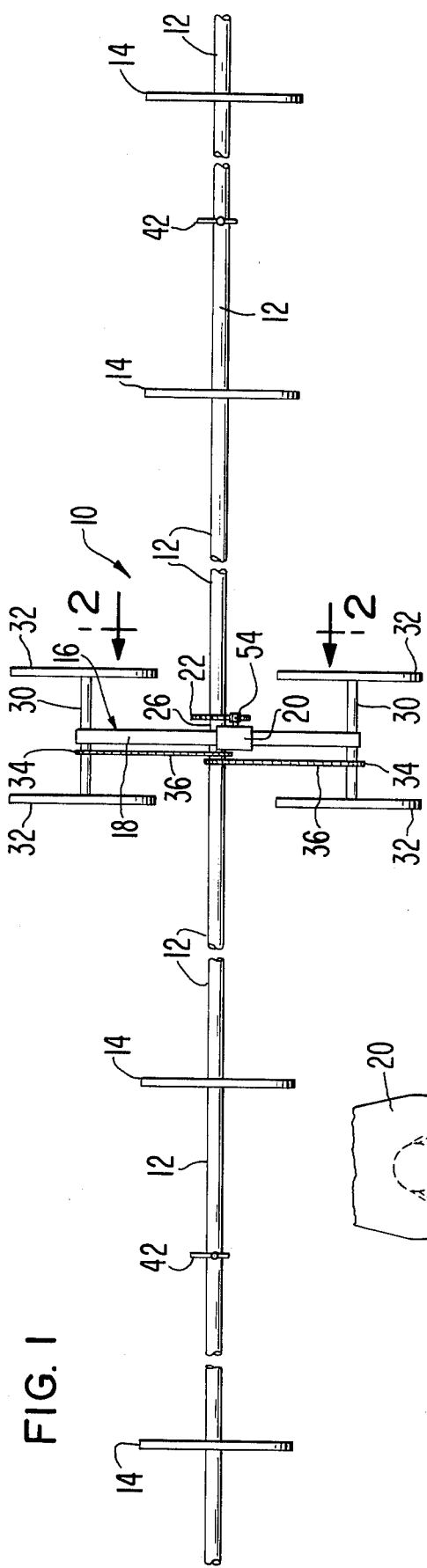
FIG. 1 is a plan view of a mobile irrigating system according to the invention.
Figure 3:
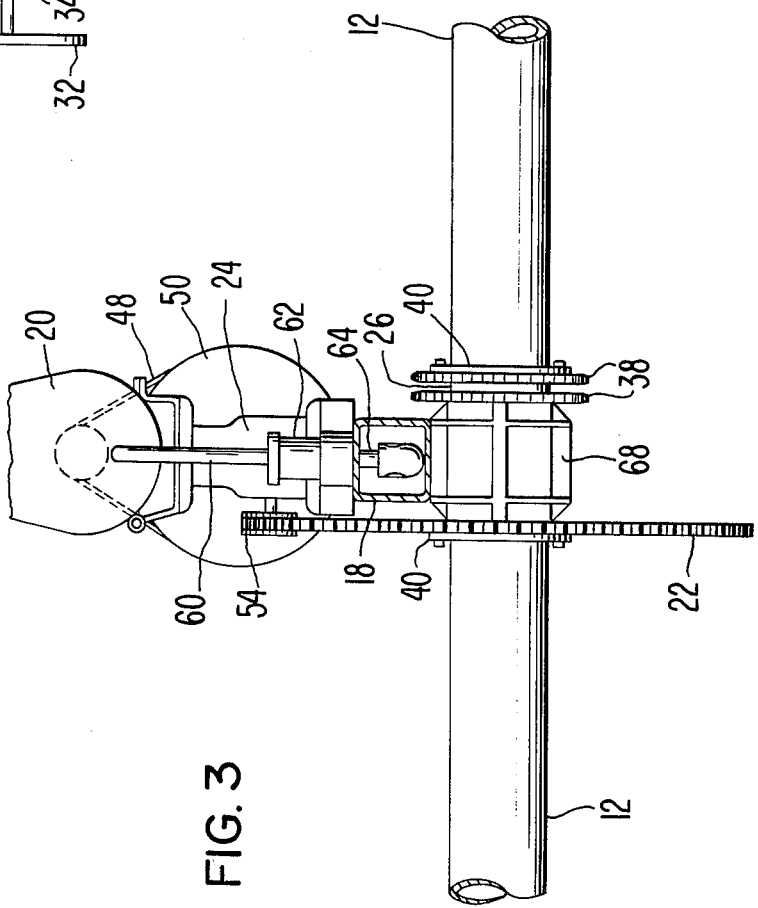
FIG. 3 is an enlarged, detailed, vertical view, with portions broken away, taken generally along the lines 3—3 of FIG. 2.

Referring now more particularly to FIGS. 1, 2 and 3, a mobile irrigation system 10 according to the invention is depicted in which a plurality of hollow irrigating pipes 12 are mounted through the center hubs of individual wheels 14 and are coupled together in a line to each side of a central power mover 16. The power mover 16 has a cross-support structure 18 on which is mounted a reversible internal combustion engine 20. The engine 20 drives a bull gear 22 through a reducing gear assembly 24 (FIG. 2). The bull gear 22 resides in a plane which is substantially parallel to the longitudinal axis of the cross support 18 and is perpendicular to the line of pipes 12. A short length of pipe 26 passes beneath the cross support 18 and through the bull gear 22. The pipe 26 is integrally connected with the bull gear 22. It is rotatably mounted to the support 18 by means of a bracket 68 (see FIG. 3). The sections of pipe 12 closest to the power mover 16 are provided with flanges 40 which bolt to the ends of the pipe 26 to make a fluid-tight coupling which is capable of transmitting torque from the bull gear 22 to the line of pipes 12.

At the distal ends of the cross support 18 are a pair of axles 30 on the ends of which are mounted wheels 32. The axles 30 are each provided with sprocket gears 34 which are connected by driving chains 36 to separate secondary sprocket gears 38 (see FIGS. 4 and 5) mounted integrally with the pipe 26 to the bull gear 22.

Each irrigating pipe 12 is provided with one or more sprinkler heads 42 and when the pipes 12 are assembled together they are aligned such that all the sprinkler heads 42 are also aligned with each other along the length of coupled pipes. An indicator 44 is mounted between the spokes of the wheels 14 at periodic intervals to visually display when the sprinkler heads 42 are pointing upwardly.

In operation, the engine 20 is started in a particular direction and this drives the gear box 24 to the bull gear 22 and sprocket gears 38 so that the pipes 12 and the wheels 32 are caused to rotate in the same direction, thereby turning the wheels 14 of the wheel-mounted irrigating pipes 12 so that the whole assembly moves along the field. It is sometimes necessary to reverse the direction of the assembly 10 in order to align, for example, the sprinkler heads 42 so that they are properly directed over the field. In such case the engine 20 is stopped and restarted in the opposite direction so that the whole assembly is moved in the rearward direction until proper alignment is obtained.

The engine 20 which is utilized is a two-cycle, eight horsepower, internal combustion, gas powered engine. The engine 20 is constructed in such a manner that it can run in either of two directions, depending on the direction in which it is started. The control for the engine will be described in greater detail in reference to FIG. 7, however, the particular engine utilized in the preferred embodiment of the invention is known in the trade as Fujiheavy's Robbin Engine, Model E.C. 17DS and is manufactured in Tokyo, Japan.

Referring now more particularly to FIG. 2, it can be seen that the engine 20 includes an output drive shaft pulley 46 which turns a driving belt 48 connected to a larger pulley 50 on the end of the drive shaft 52 of the reduction gear assembly 24. The reduction gear assembly 24 has a low speed, output pinion gear 54 which engages with and drives the bull gear 22.

The motor 20 is connected by means of a cable 56 to a battery 78 (see FIG. 7) within a control case 58 mounted on the cross support 18. The engine receives fuel through a line 60 to a coupling 62 mounted in the cross support 18.

Figure 6:
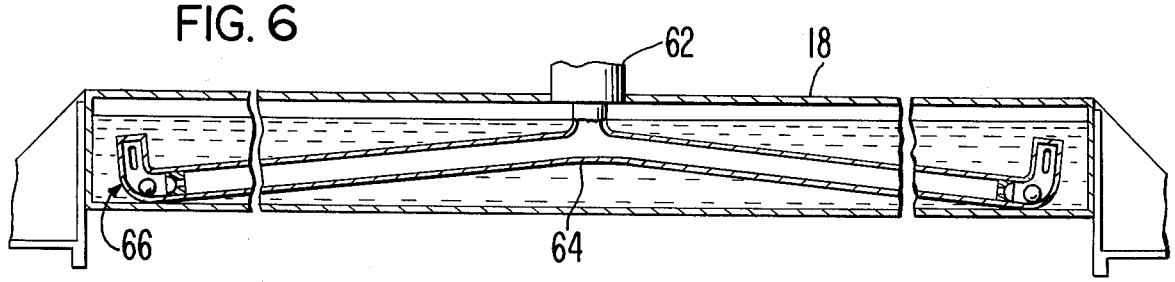
FIG. 6 is an enlarged vertical view, in section, and with portions broken away of the center support structure of the centralized power unit of the invention.

As is more clearly depicted in FIG. 6, the cross support 18 is hollow and is used to store a growing season's supply of gasoline fuel for the engine 20. The coupling 62 passes through the upper surface of the cross support 18 and is attached to a hollow, T-shaped member 64 which extends the length of the hollow interior of the cross support 18. The ends of the T-shaped member 64 are equipped with ball-check valves 66 which serve the purpose of closing off either upon end of the T-shaped member 64 whenever the corresponding end of the cross support 18 is tilted upwardly so that the fuel drains to the opposite end of the cross support 18. This prevents air from being sucked into the fuel line 60.

Figure 4:
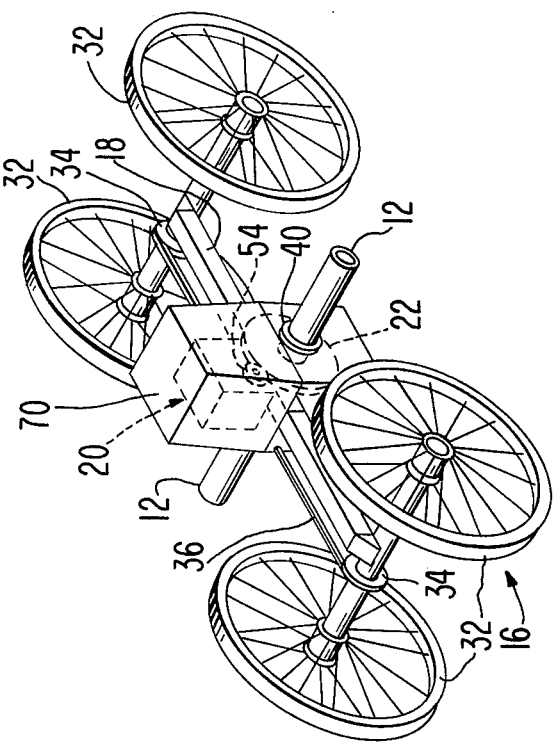
FIG. 4 is a perspective view of the central, motorized power unit of the invention.

Referring now more particularly to FIG. 4, it can be seen that the engine 20 and the gears 22 and 38 together with the driving chain 36 are enclosed in a casing 70 which not only protects the engine from spray from the irrigation system, but also protects the operator and the crops from entanglement with the sprocket gears and driving chains. Furthermore, the cover 70 can be locked to secure the motor from vandalism. The ends of the driving chains 36 opposite to the engine 20 can be enclosed in separate fiberglass covers 71 (see FIG. 5) to further protect the operator and crops from entanglement.

Figure 5:
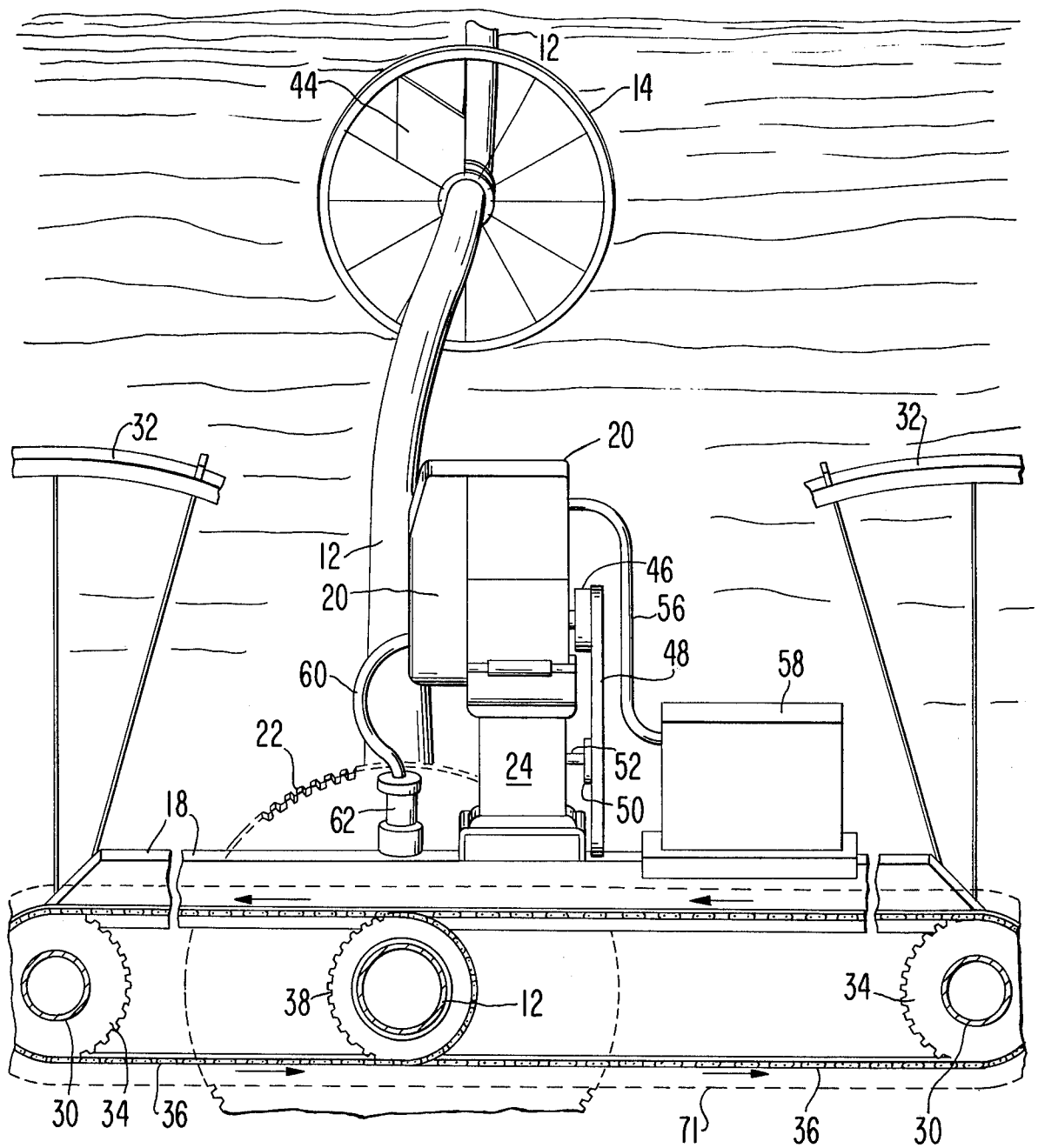
FIG. 5 is a slightly enlarged view, with portions broken away depicting the opposite side of the centralized power unit depicted in FIG. 4 together with a portion of a coupled line of irrigating pipes.

As can be seen by the exaggerated bend in the line of pipes 12 in FIG. 5, a certain amount of jockeying in the position of the power mover 16 is sometimes required to straighten out the line. It is for this purpose that the engine 20 must be of the reversible type so that the power mover may be backed down the field.

The control circuit for the engine 20 will now be described in detail with reference more particularly to FIG. 7. The engine 20 is depicted diagrammatically in a dashed line box and is an integral unit including a starter winding 72, an armature 74 and a generator winding 76. It should be pointed out that the armature 74 serves a dual purpose as the armature for both the generator winding 76 and for the starter winding 72 and is mounted directly on the output shaft of the engine 20. In operation, the engine 20 is started in a particular direction by passing electrical current through the starter winding 72 and the armature 74. The output of the generator must be switched to ensure that voltage of a proper polarity will be applied to charge the battery 78. In order to operate the engine in the reverse direction, the current through the starter winding 72 is reversed by means of a control circuit, to be described in detail hereinafter, so that the armature 74 is rotated in the opposite direction and the engine will start running and maintain its operation in that direction. The output from the generator winding 76 must correspondingly be reversed by the control circuit in order to properly charge the battery.

The negative terminal of the battery 78 is connected to the circuit ground and the positive terminal is connected through a fuse 80 to the "BAT" terminal of a voltage regulator 82. The positive terminal of the battery 78 is also connected through a normally open relay switch 84 to one terminal of a normally open relay switch 86 and to one terminal of a normally closed relay switch 88. The opposite terminal of the switch 86 is connected to one terminal 90 of the starter coil winding 72. The other terminal of the relay switch 88 is connected to the other terminal 92 of the starter coil 72. The relay switch 84 is operated by a relay coil 94 and the relay switches 86 and 88 are operated by a relay coil 96.

The starter coil terminal 90 is also connected to one terminal of a normally closed relay switch 98 and the terminal 92 of the starter coil is also connected to one terminal of a normally open relay switch 100. The opposite terminals of the relay switches 98 and 100 are together connected to one side of the armature 74 whose other side is connected to the circuit ground. The ungrounded side of the armature 74 is connected to the "ARM" terminal of the voltage regulator 82.

One terminal 102 of the generator winding 76 is connected to the normally closed contact 104 of a single pole, double throw relay switch 106. The terminal 102 is also connected to the normally open contact 108 of a single pole, double throw relay switch 110. The other terminal 112 of the generator winding 76 is connected to the normally open contact 114 of the switch 106 and the normally closed contact 116 of the switch 110. The pole contact of the switch 106 is connected to the "FLD" terminal of the voltage regulator 82 and the pole contact of the switch 110 is connected to the ARM contact of the voltage regulator 82. The relay switches 106 and 110 are together controlled by a relay coil 118 which has one lead connected to the circuit ground and the other lead connected to one terminal of a normally open switch 120. A diode 122 is connected in parallel with the relay coil 118 so that its anode electrode is connected to the circuit ground.

The relay switches 98 and 100 are controlled by a relay coil 124 which is connected in parallel with the relay coil 96. The relay coils 96 and 124 are both connected at one side to the circuit ground and at their opposite side to the normally open contact of a relay operated switch 126. The relay switch 126 is operated by the relay coil 118. The pole contact of the relay switch 126 is connected to the BAT terminal of the voltage regulator 82. The relay coils 96 and 124 have diodes 128 and 130 connected in parallel with them, respectively, with the anodes of the diodes connected to the circuit ground.

One terminal of the relay coil 94 is connected to the circuit ground and the other terminal is connected to the normally open terminals of a single pole, double throw switch 132. The switches 120 and 132 are ganged together and constitute a double pole, double throw switch S1 whose contacts are normally open. The pole contact of the switch 120 is connected through a resistor 134, having a relatively low value such as 18 ohms, to the pole contact of the switch 132 and the BAT terminal of the voltage regulator 82. The normally open, stationary contacts of the switch 132 are connected together by a lead 136 to the spark coil (not shown) of the engine. The other side of the spark coil is, of course, connected to the circuit ground.

The lead 136 is connected to a terminal 138 and the ungrounded lead of the relay coil 118 is connected to a terminal 140. The plus (12 volt) terminal of the battery 78 is connected to a terminal 142 and the circuit ground is connected to a terminal 144.

Figure 7:
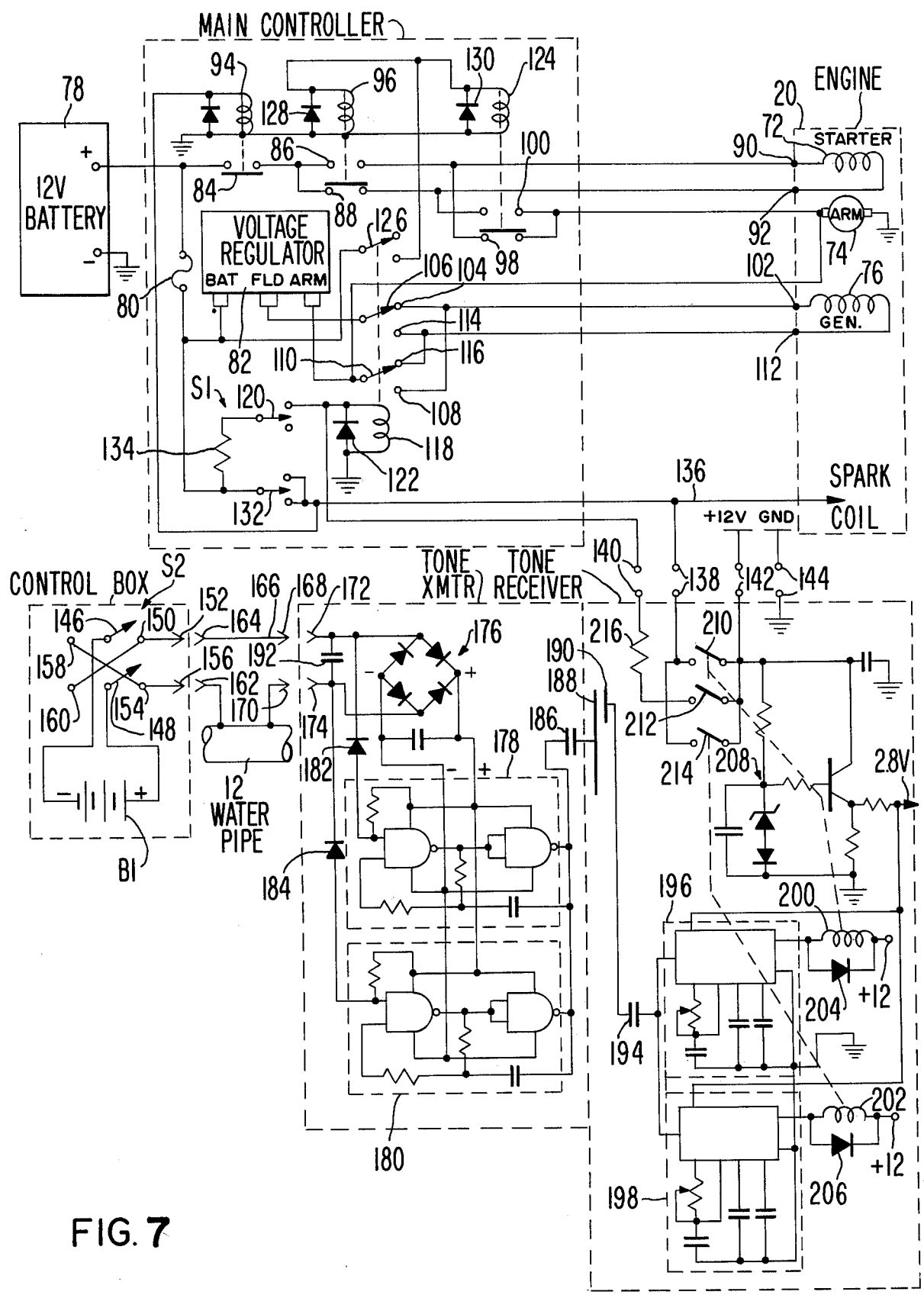
FIG. 7 is a schematic diagram of the motor control circuit of the invention.

When it is desired to control the movement of the system at the power mover, the switch S1 is manually moved either upwardly or downwardly as depicted in FIG. 7. With the switch S1 thrown in the upward position, as depicted in FIG. 7, the relay coil 118 is energized thereby closing the switches 126, 106-114, and 110-108. The closing of these switches, in turn, energizes the relay coils 96 and 124 to close the switches 86 and 100, respectively. The closing of the switch S1 also energizes the relay coil 94 to close the relay switch 84. The net result of these switch closings is that the positive terminal of the battery 78 is connected to the terminal 90 of the starter coil 72 and the terminal 92 of the starter coil 72 is connected through the armature 74 to the circuit ground and to the armature terminal of the voltage regulator 82. The generator coil terminal 102 is connected to the ARM terminal of the voltage regulator 82 and the generator coil terminal 112 is connected to the FLD terminal of the voltage regulator 82. In this way the engine is started in a predetermined direction and will continue to run in that direction. Furthermore, the power output from the generator coil 76 is applied with the proper polarity to run the engine as well as to charge the battery 78.

When the switch S1 is manually thrown in the opposite direction, all of the above-described relay switches, with the exception of the switch 84, return to their normal positions which has the effect of applying a voltage of the opposite polarity to that described above from the battery 78 to the starter coil 72 and of reversing the connections from the generator winding 76 to the voltage regulator 82. The relay coil 94, however, is still energized to close the relay switch 84 In this mode, the engine is started in the opposite direction from the previously described direction and the engine will continue to run in that direction until the switch S1 is opened. The connections from the generator coil 72 to the regulator 82 are reversed from that previously described so that the same polarity as that described above will be applied to the battery 78 and the engine 20.

Although the relay switches 86, 88, 98 and 100 are described as being operated by two separate relay coils, it should be apparent that in other embodiments they may all be operated directly by the relay coil 118.

In order to operate the above described controller remotely, that is, from the end of the line of irrigating pipes 12, a control system having a tone transmitter and a tone receiver is utilized. Referring again to FIG. 7, a small battery B1, of the 9-volt transistor radio type, is connected with its minus (−) terminal to one moving contact 146 of a double pole, double throw on-off-on, key operated switch S2. The positive terminal of the battery B1 is connected to the moving contact 148 of the switch S2. A stationary contact 150 which connects with the moving contact 146 is connected to a male plug terminal 152. A stationary contact 154, which connects with the moving contact 148 and corresponds, in position, to the contact 150 is connected to a male plug terminal 156. The other stationary contact 158, which connects with the moving contact 146, is connected to the male plug terminal 156 and the other stationary contact 160, which connects with the moving contact 148, is connected to the male plug terminal 152. Together the male plug terminals 152 and 156 are embodied in a single male plug unit which is mounted in a control box (not shown) which houses the battery B1 and the switch S2. As can be seen from the circuit diagram, the purpose of the switch S2 is to allow the battery B1 to be connected across the terminals 152 and 156 and to allow the polarity of the battery connections to be reversed.

A female terminal 162, corresponding to the male terminal 156, is connected to the end of the irrigating pipe 12 which is away from the power mover 16, that is, at the end of the water pipe 12 which is at one side of the field to be irrigated. A female terminal 164, corresponding to the male terminal 152, is connected by means of a wire 166 to a male terminal 168. The female terminals 162 and 164 are mounted together in a socket on the end of the pipe 12 closest to the side of the field. The end of the irrigating pipe 12 closest to the power mover 16 is connected to a male terminal 170. The male terminals 168 and 170 are mounted in a single plug unit at the end of the irrigating pipe 12 closest to the power mover 16. It should be understood that the insulated wire 166 is made up of a plurality of connected segments, each of which is mounted on a separate length of pipe 12.

A female terminal 172, corresponding to the male terminal 168, and a female terminal 174, corresponding to the male terminal 170, are connected to the opposite sides of a full-wave rectifier bridge circuit 176. The positive (+) and negative (−) output terminals of the bridge 176 are connected to the corresponding positive (+) and negative (−) power terminals of a first tone generating circuit 178 and a second tone generating circuit 180. The female terminal 172 is also connected to the input of the tone generator 178 through a diode 182 which has its cathode connected to the female terminal 172. The tone generator 180 is connected to the female terminal 174 through a diode 184 whose cathode is connected to the female terminal 174.

The circuit details of the tone generators 178 and 180 will not be described since they are well known in the art. They are each composed of a NAND gate in series with a NOR gate with RC tuned regenerative feedback. Each of the tone generators 178 and 180 produces an output alternating current signal at separately tuned frequencies when the tone generators are energized.

The tone generators are energized when a signal of the proper polarity is applied to their inputs through one of the diodes 182 and 184. Thus, for example, when the battery B1 is connected by means of the switch S2 so that the negative terminal of the battery is connected to the female terminal 174, the diode 184 will become conductive and the tone generator 180 will alone be energized since the diode 182 is biased to be non-conductive. Correspondingly, when the switch S2 is reversed the tone generator 178 alone will be energized.

The outputs from the tone generators 178 and 180 are connected through a capacitor 186 to an insulated plate 188 mounted coaxially with the bull gear 22. In practice, the tone transmitter unit is mounted on the bull gear 22 of the power mover 16 and rotates with the bull gear 22. An insulated plate 190 is mounted on the cross support 18 of the power mover unit 16 and is closely spaced apart from the plate 188 so that a capacitive coupling is achieved between the two plates 188 and 190. A capacitor 192 is connected between the female terminals 172 and 174 of the tone transmitter to provide the tone generators 178 and 180 with a connection to the circuit ground, i.e., the pipe 12, for the tone signal at all times.

The plate 190 is connected through a capacitor 194 to the joint input of a pair of tone receivers 196 and 198. The tone receivers 196 and 198, whose details will not be described since such circuits are well known to those skilled in the art, are tuned to the tone frequencies of the generators 178 and 180, respectively. The outputs from the tone receivers 196 and 198 are each applied to one lead of separate relay coils 200 and 202 whose other leads are connected to the plus 12-volt power supply through the terminal 142. Each of the relay coils 200 and 202 is connected in parallel with a separate diode 204 and 206, respectively. The cathodes of the diodes 204 and 206 are connected to the plus 12-volt supply. The tone receivers 196 and 198 are supplied with power from a 28-volt transistorized source 208 within the tone receiver unit which receives its power from the 12-volt battery 78 through the terminals 142 and 144.

The relay coil 200 operates a pair of normally open relay switches 210 and 212. The relay coil 202 operates a normally open relay switch 214. The relay switch contacts 210 and 214 are connected in parallel between the terminals 138 and 142. The switch contacts 212 are connected in series with a resistor 216, corresponding to the resistor 134, between the terminals 140 and 142.

In operation, when the tone generator 178 is energized the tone receiver 196 will cause the relay coil 200 to close the relay switches 210 and 212. The closing of these relay switches supplies plus 12 volts of power to the spark coil and to the relay coil 94 to thereby close the relay switch 84. Plus 12 volts of power is also supplied to the relay coil 118 to thereby operate the switches 126, 106–114, 110–108 and, through the relay coils 96 and 124, the switches 88 and 98. This has the effect of starting the engine 20 in a predetermined direction and applying the power generated by the coil 76 to the battery 78 through the voltage regulator 82 with the proper polarity, as described above in the reference to the manual operation of the switch S1.

When the tone generator 180 is energized, the tone receiver 198 energizes the relay coil 202 to close the switch 214, and thereby supplies plus 12 volts of power to the spark coil of the engine and to the relay coil 94 to close the switch 84. The other switches of the circuit remain in their normally open state and the engine is started in the opposite direction. The power from the generator coil 76 is again supplied with the proper polarity to the battery 78 through the voltage regulator 82, although the connections from the coil 76 are reversed by the opening of the switches.

Thus, in the remote control unit described above, the operator need merely plug in a small case containing the battery B1 and the key operated switch S2 to start the engine 20 in one of two predetermined directions. Because of the use of the tone transmitters and tone receivers, the whole assembly is easily coupled and decoupled from the irrigation system without maintenance or reliability problems.

While in the above described embodiment only certain types of arrangements of the coupled line of irrigating pipes 12 mounted on the wheels 14 have been depicted, it should be apparent that other embodiments are equally usable with the centralized power mover 16 according to the invention. For example, in other embodiments drag pipelines, that is, trailing sprinklers connected by flexible irrigating pipes to the midpoints of the irrigating pipes 12 may be utilized. In some applications this arrangement can give a more complete coverage to the irrigating spray. Also in the preferred embodiment, although not shown, the end pipe 12 contains a male piece which telescopes into a female piece to connect the end of the line of pipes 12 to standard, irrigating, riser valves located at periodic intervals along the side of the field. While the invention is not limited to a particular form of mobile irrigating system, in one preferred embodiment the spacing between the wheels 14 is approximately forty feet and one revolution of the wheel 14 moves the assembly approximately fifteen to twenty feet.

There are several advantages to the overall arrangement of the invention as described above. For example, because the pipes 12 do not need to pass through the bull gear 22, as is done in some prior types of embodiments, it is much more convenient to connect the mobile power unit 16 to the line of pipes 12 than in such other prior art systems. This feature also allows the wheels 14 to be centered at the middle of each length of pipe 12 so that the pipe 12 may be conveniently rolled into place prior to coupling.

The terms and expressions which have been employed here are used as terms of description and not of limitations, and there is no intention, in the use of such terms and expressions, of excluding equivalents of the features shown and described, or portions thereof, it being recognized that various modifications are possible within the scope of the invention claimed.

What is claimed is:

1. An improved, mobile irrigating system of the type having a plurality of wheel mounted irrigating pipes coupled in line to a central, motorized power unit which turns the irrigating pipe wheels by turning the line of coupled pipes wherein the improvement comprises a reversible, internal combustion engine for operating the central, motorized power unit, the engine having a shaft which rotates in either of two directions depending upon the direction of rotation used to start the engine, reversible electric starter means for selectively rotating the engine shaft in one of the two directions to start the engine, and means for remotely controlling the starter means from one end of the line of pipes.

2. An improved mobile irrigating system as recited in claim 1 wherein the starter means rotates in one of two directions depending upon the polarity of a control signal, the control means includes a remote unit for generating a control signal of a selected polarity, a control unit mounted at the central power unit and responsive to the polarity of the control signal, an insulated conductor mounted on at least a part of the coupled line of irrigating pipes, and means for conveying the control signal generated by the remote unit to the control unit via both the coupled line of irrigating pipes and the insulated conductor.

3. An improved method of moving wheel mounted irrigation pipes coupled together in a line for rotation by a central, motorized power unit having an internal combustion engine which is selectively started and stopped, wherein the improvement comprises selectively starting and running the power unit engine in a first direction to a first predetermined position, stopping the engine, and thereafter restarting and running the engine in the opposite direction to a second predetermined engine in the opposite direction to a second predetermined position and wherein the steps of starting, stopping and restarting the engine are controlled remotely from the engine at one end of the coupled line of irrigating pipes.

4. An improved method of moving wheel mounted irrigating pipes as recited in claim 3 wherein the steps of starting, stopping and restarting the engine are carried out remotely from the engine at one end of the coupled line of irrigating pipes.

5. An improved method of moving wheel mounted irrigating pipes as recited in claim 3 further comprising the steps of transmitting a DC control signal having a predetermined one of two polarities to the engine, in part, through the coupled line of irrigating pipes to control the direction in which the engine is started.

6. An improved, mobile irrigating system of the type having a plurality of wheel mounted irrigating pipes coupled in line to a central, motorized power unit which turns the irrigating pipe wheels by turning the line of coupled pipes wherein the improvement comprises a reversible, internal combustion engine for operating the central, motorized power unit, the engine having a shaft which rotates in either of two directions depending upon the direction of rotation used to start the engine reversible starter means for selectively rotating the engine shaft in one of two directions to start the engine, and means for remotely controlling the starter means from one end of the line of pipes, the remote control means including a remote unit for selectively generating signals of different current polarities, a control unit mounted on the central power unit and including means responsive to tone signals of two different predetermined frequencies, an insulated conductor mounted on at least a part of the coupled line of irrigating pipes and means for conveying the signals generated by the remote unit to the control unit including means electrically connected to the insulated conductor and to the line of irrigating pipes for generating an output signal of one of two tone signals of the predetermined frequencies depending on the current polarity of the signals from the remote unit and capacitive coupling means for supplying the tone output signal to the control unit, the capacitive coupling means being mounted for connection between the rotating line of irrigating pipes and the central, motorized power unit.

* * * * *